Apr. 3, 1923.
T. VARNEY
1,450,528
CLAMP DEVICE FOR ELECTRIC CONDUCTORS
Filed Aug. 14, 1920
2 sheets-sheet 1
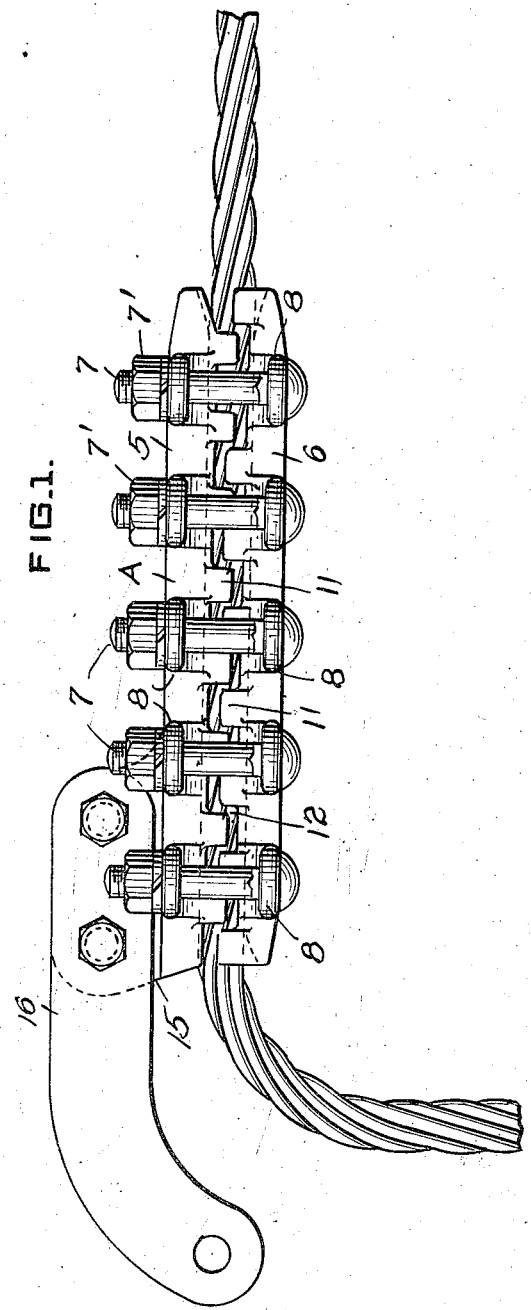
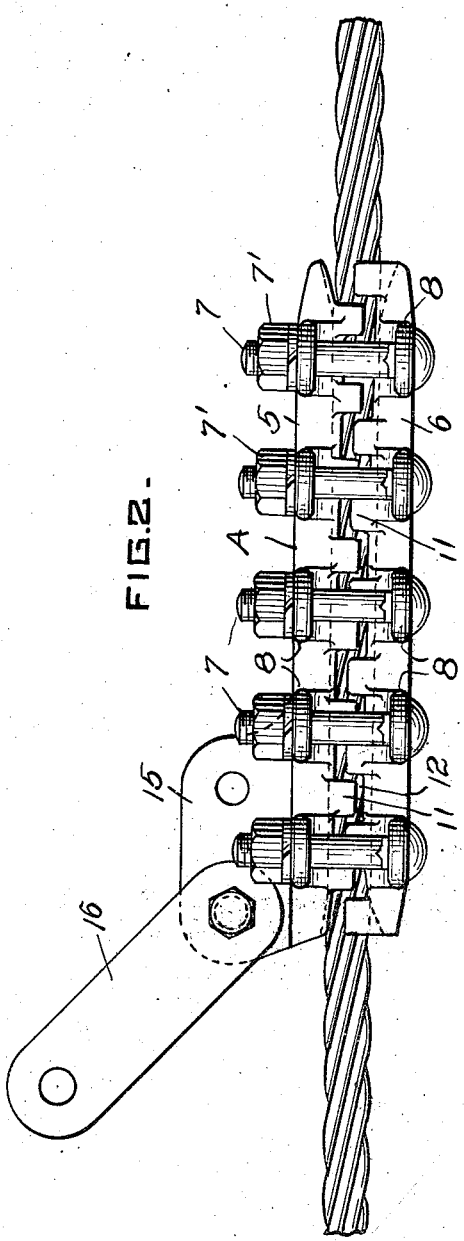
WITNESSES
INVENTOR Apr. 3, 1923.
T. VARNEY
1,450,528
CLAMP DEVICE FOR ELECTRIC CONDUCTORS
Filed Aug. 14, 1920
2 sheets-sheet 2
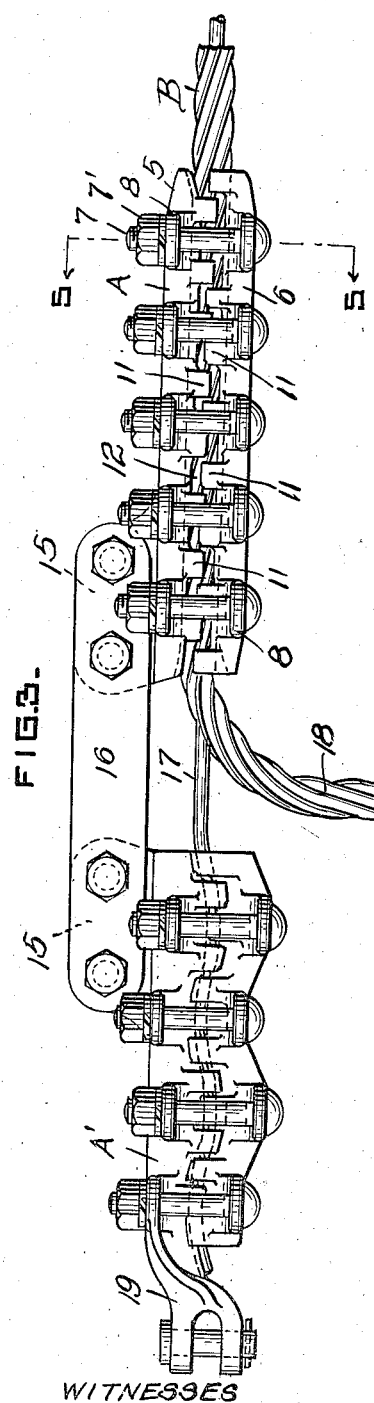
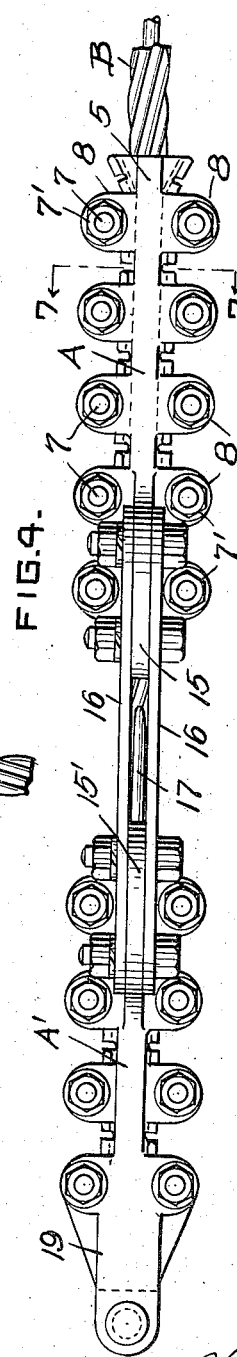
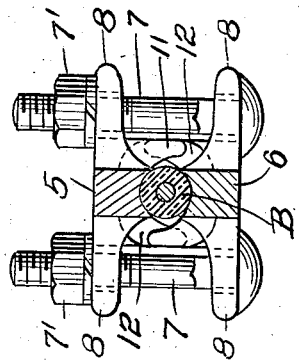
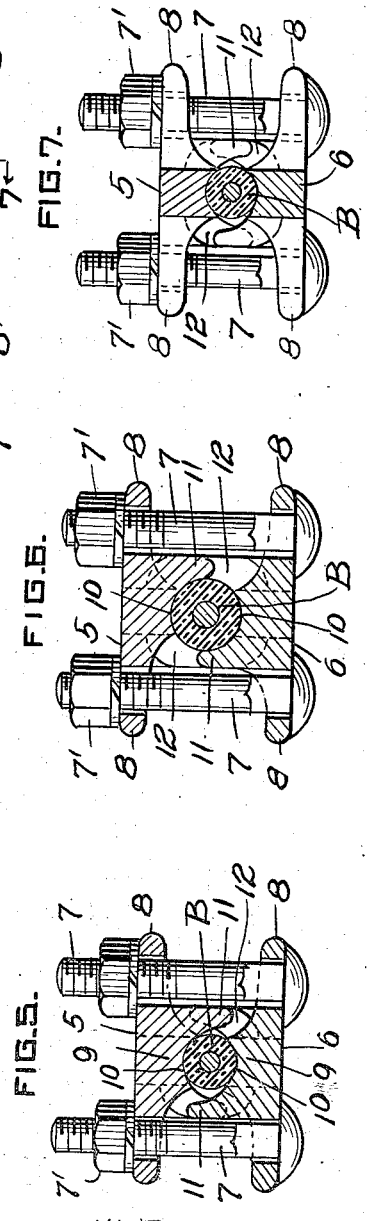
WITNESSES
INVENTOR Patented Apr. 3, 1923.

1,450,528

UNITED STATES PATENT OFFICE.

THEODORE VARNEY, OF SEWICKLEY, PENNSYLVANIA, ASSIGNOR TO ALUMINUM COMPANY OF AMERICA, OF PITTSBURGH, PENNSYLVANIA, A CORPORATION OF PENNSYLVANIA.

CLAMP DEVICE FOR ELECTRIC CONDUCTORS.

Application filed August 14, 1920. Serial No. 403,455.

*To all whom it may concern:*

Be it known that I, THEODORE VARNEY, a citizen of the United States, and a resident of Sewickley, in the county of Allegheny and State of Pennsylvania, have invented certain new and useful Improvements in Clamp Devices for Electric Conductors, of which the following is a specification.

This invention relates to clamps for cables, and particularly to anchor or strain clamps for electric conductor cables used in high tension transmission lines.

In the transmission of high tension currents, the conductors are usually supported from structural steel towers which are generally several hundred feet apart. The cables themselves are not secured to the supporting towers, but are held in position by a series of insulators with which they are connected through suitable clamps. The cables may be made of any desired material and in any suitable manner, but where the strain on them is heavy, due to the weight of the cable and to the towers being such a long distance apart, they are preferably provided with longitudinal strengthening means or a high strength core, such as steel wire surrounded by strands of conducting material, preferably aluminum.

An object of the present invention is to provide a clamp for firmly engaging the cable and transmitting the strain to the supports through suitable insulators.

A further object of the invention is to provide such a clamp for use in connection with transmission lines where a cable having a high strength core is employed, which clamp will engage a portion of a cable as a whole and also engage separately the high strength core.

It is a still further object of the invention to provide a clamp of this nature having a series of interlocking extensions which make the clamp effective for use with cables of various sizes.

My invention is shown in the accompanying drawings, in which,

Fig. 1 is a side elevation of an anchor clamp constructed in accordance with my invention, particularly adapted for use in transmitting the tension to a supporting structure in line with the cable;

Fig. 2 is a similar view showing a semi-anchor clamp used when it is desired to transmit only a part of the cable tension to the supporting structure;

Fig. 3 is a side elevation of a preferred form of my invention for use in connection with a cable having a high strength core;

Fig. 4 is a top view of the clamp shown in Fig. 3;

Fig. 5 is a section on line 5—5 of Fig. 3, showing the clamp in use with a cable of relatively small diameter;

Fig. 6 is a similar section showing the clamp in use with a cable of relatively large diameter; and Fig. 7 is a section on line 7—7 of Fig. 4.

In the drawings, the clamp is indicated at A and comprises opposed plates or members 5 and 6 of substantially similar design adapted to be held together by bolts 7 passing through ears 8 which project at intervals from the sides of the plates 5 and 6. The bolts 7 are provided with threaded nuts 7' of usual design.

The inner faces of each of the plates 5 and 6 are provided with inwardly extending portions 9, the shape of these portions being shown in cross section in Figs. 5, 6 and 7. These portions 9 are provided along the center with a groove or rounded seat 10 with which the cable contacts. On each side of the portions 9, and in staggered relation to each other, are a series of spaced apart curved lugs or extensions 11. Between each two lugs is a recess 12. These recesses are adapted to receive extension 11 of the opposite plate when the two plates are in clamped relation so that the extensions interlock. As shown in Fig. 5, in which B indicates the cable, the rounded portions 10 give a sufficient gripping action where a cable of small size is being clamped, but when a cable having a relatively large diameter is being held, the interlocked curved extensions 11 give an additional gripping action, this being shown in Fig. 6.

One of the plates, such as 5, is preferably provided at one end with a fin or lug 15. To this fin 15 may be bolted a pair of parallel supporting links 16. When an ordinary cable is to be clamped against endwise strain, these links are curved, as shown in Fig. 1, and are rigidly connected to the fin. Where the cable is run through the clamp without being entirely anchored or supported against longitudinal strain, the clamp being then used as what is termed a "semi-anchor," the straps or links 16 are straight and are pivotally connected with the fin, as shown in Fig. 2.

When it is desired to provide an anchor clamp for a cable B having a high strength core 17 surrounded by the stranded conductor 18, as shown in Figs. 3 and 4, the links 16 are rigidly connected to the fin 15 and to a similar fin 15' on a second clamp A', the construction of which is, in most respects, similar to the clamp A. That is to say, clamp A' comprises adjustably opposed members having grooved cable engaging seats and interlocking extensions, but it is preferred that the grooved seat portions of the members of the clamp A' be formed with undulations to provide a sinuous or wavelike gripping surface for the cable, which bend the cable from a straight path, as shown in Fig. 3, and thereby more effectively hold it against endwise strain. The end of this clamp A' is provided with a bifurcated extension 19 adapted to connect with the supporting structure (not shown). The first clamp member A engages the outside of a portion of the entire cable. The portion of the conductor 18 projecting beyond the clamp member A is stripped from the core 17, and this core is engaged by the clamping member A'.

In use, the clamps are applied to the cable, and the plates 5 and 6 are drawn together to clamp the cable therebetween by means of bolts 7 and nuts 7'. If desired, lock washers, as shown, may be employed beneath the nuts 7'.

While the invention has been described as being particularly adaptable for use in connection with electric conductors, obviously, it could be advantageously employed for other purposes.

What I claim is:

1. A clamp for cables comprising a pair of adjustably opposed members, each member consisting of a central rib portion having a concaved cable engaging seat on the inner face thereof, laterally extending lugs on the members, bolts cooperating with the lugs for holding the members together, and extensions at the sides of the ribs, said extensions being so arranged that they may interfit when the two members are bolted together, the said lugs and bolts being so arranged with relation to the seats and extensions as to enable said extensions to move into closely interfitting positions.

2. A clamp for cables comprising a pair of adjustably opposed members, each member consisting of a central rib portion having a concaved cable engaging seat on the inner face thereof, laterally extending lugs on the members, bolts cooperating with the lugs for holding the members together, and extensions at the sides of the ribs, said extensions being so arranged that they may interfit when the two members are bolted together, the said lugs being disposed in a plane recessed from the cable engaging seats whereby said members may be adjusted close together to engage cables of very small diameters without said extensions limiting such adjustment by contact with the lugs.

3. A clamp for electric conductor cables comprising a pair of opposed members, interlocking means on said members, a second pair of opposed members having interlocking means, offset means connecting said pairs of members in a substantially fixed relation to each other, and means for supporting the clamp as a unit against longitudinal strain in one direction.

4. The combination with an electric conductor cable comprising strands of electrical conducting material and a longitudinal strengthening means, of a unitary clamping structure for clamping the cable and independently clamping the said strengthening member including two pairs of opposed members having interlocking means, means rigidly connecting said pairs of opposed members, and other means on one end of one of said pairs of members for connection with a supporting structure.

5. A clamp for electric conductor cables including a pair of opposed members, interlocking means on said members, a second pair of opposed members having interlocking means thereon, said second pair of members providing a sinuous clamping means for the cable, means connecting said pairs of members, and means at the free end of said second pair of members for connection with a supporting structure.

6. An anchor clamp for cables comprising a pair of opposed plates, each of said plates having inwardly projecting seat portions adapted to engage the cables, a series of alternately arranged spaced apart extensions on each side of said projecting portions and adapted to engage cables of relatively large diameter, and means for holding said plates together to clamp the cable.

7. An anchor clamp for cables comprising a pair of opposed plates, each of said plates having inwardly projecting portions adapted to engage the cable, a series of spaced apart extensions on each side of said cable engaging portions and adapted to engage cables of relatively large diameter, the extensions on one side of each plate being staggered with relation to those on the other side of the plate, ears projecting from each side of said plates, and bolts passing through said ears.

8. An anchor clamp for cables comprising a pair of opposed plates each having a centrally disposed inwardly projecting cable engaging portion which is provided with interlocking side extensions, means for holding the plates in clamping relation, a fin projecting from one end of one of said plates, and a supporting link connected to said fin.

9. An anchor clamp for cables comprising a pair of opposed plates having centrally disposed inwardly projecting cable engaging portions which are provided with interlocking side extensions, means for holding the plates in clamping relation, a fin projecting from one end of one of said plates, and a supporting link rigidly connected to said fin.

10. An anchor clamp for cables comprising a pair of opposed plates having inwardly projecting cable engaging portions which are provided with interlocking side extensions, means for holding the plates in clamped relation, a fin projecting from one end of one of said plates, a supporting link connected to said fin, a second pair of similarly formed clamping plates connected with said link, and means on the free end of said second pair of clamping plates for connection with a supporting structure.

11. A cable clamp comprising a pair of opposed plates, each of which has an inwardly projecting centrally positioned longitudinally extending sinuous cable engaging seat having spaced apart extensions at each side thereof, the extensions on one side being staggered with relation to those on the other, the extensions on the opposed plates interfitting, and means for holding the plates together in clamping relation.

12. A clamping structure for supporting a conducting cable which is composed of a longitudinally extending strengthening core surrounded by conducting strands, said clamp structure comprising a clamp for engaging the cable, a separate clamp for engaging the strengthening core, means for connecting the two clamps, and means for supporting the clamping structure against longitudinal strain in one direction.

13. A clamping structure for supporting a conducting cable which is composed of a longitudinally extending strengthening core surrounded by conducting strands, said clamping structure comprising a clamp for engaging the cable, a separate clamp for engaging the strengthening core, means out of line with the line of pull of the cable under tension for connecting the two clamps, and means for supporting the clamping structure against longitudinal strain in one direction.

In testimony whereof I affix my signature in presence of two witnesses.

THEODORE VARNEY.

Witnesses:
J. M. GEOGHEGAN,
LOIS WINEMAN.